United States Patent [19]
Miller

[11] Patent Number: 5,840,632
[45] Date of Patent: Nov. 24, 1998

[54] REMOVAL OF ORGANIC CONTAMINANTS USING POLYMERIC SHEETS, FILMS, STRANDS AND FILAMENTS

[75] Inventor: Gerald W. Miller, Cincinnati, Ohio

[73] Assignee: Hitech Polymers Inc., Cincinnati, Ohio

[21] Appl. No.: 723,388

[22] Filed: Sep. 30, 1996

[51] Int. Cl.⁶ .................................................. C08L 63/00
[52] U.S. Cl. ............................ 442/62; 442/76; 442/121; 442/171; 521/134
[58] Field of Search ................................. 442/60, 62, 76, 442/121, 171; 521/134

[56] References Cited

U.S. PATENT DOCUMENTS

| | | |
|---|---|---|
| 3,518,183 | 6/1970 | Evans . |
| 3,819,514 | 6/1974 | Clampitt et al. . |
| 3,929,631 | 12/1975 | Winkler . |
| 3,939,237 | 2/1976 | Naito et al. ............................ 264/54 |
| 4,082,660 | 4/1978 | Papier et al. . |
| 4,167,973 | 9/1979 | Forte et al. . |
| 4,420,573 | 12/1983 | Fogg et al. . |
| 4,801,386 | 1/1989 | Sugimori et al. . |
| 4,929,341 | 5/1990 | Thirumalachar et al. . |
| 4,941,978 | 7/1990 | Gabrick . |
| 5,019,245 | 5/1991 | Ignasiak et al. . |
| 5,104,548 | 4/1992 | Gabrick . |

FOREIGN PATENT DOCUMENTS 0518336  12/1992  European Pat. Off. .

OTHER PUBLICATIONS

Japanese Abstract No. 159155 dated Aug. 2, 1978.
Japanese Abstract No. 135702 dated Jun. 1, 1978.
USSR Abstract No. 789329 dated Apr. 23, 1987.
Crowley Chemical Company Technical Bulletins "VESTOPLAST 608 and 750" VESTOPLAST 508, 1995.
Dow Corning "ENGAGE" product sheet, 1995.
Exxon Chemical "EXACT™ 4049" product sheet, 1995.

*Primary Examiner*—Christopher Raimund
*Attorney, Agent, or Firm*—Nixon & Vanderhye P.C.

[57] ABSTRACT

A method and compositions for removing organic contaminants from contaminated liquid, gas, or soil in fluent form are easily practiced and handled, highly absorbent, and readily collected. A foamed sheet, film, strands, or filament mat is formed from a composition comprising 5–49% by weight polystyrene, polypropylene, or other polymer; about 0–1% by weight blowing agent such as sodium tetraborate; and substantially the balance of elastomeric material. Contaminated liquid, gas, or soil in fluid form, or mixtures thereof into contact with the sheet, film, strands, or mat, so that the sheet, film, strands, or mat absorb at least 90% (typically at least 100%) of their weight of organic contaminants from the contaminated material. A sheet or film may be formed by extruding through a sheet or film die a composition of 10–45% polystyrene, 0.1–1% blowing agent, and substantially the balance styrene/ butadiene/styrene triblock polymer; foamed strands may be formed by extruding through die holes a composition of 10–49% polystyrene, 0.1–1% blowing agent, and substantially the balance elastomeric material; and foamed filaments formed by extruding through die holes a composition of 5–45% polypropylene, 0–1% blowing agent, and substantially the balance elastomeric material are formed into a non-woven mat of continuous filaments with random orientation.

19 Claims, 2 Drawing Sheets

5,840,632

REMOVAL OF ORGANIC CONTAMINANTS USING POLYMERIC SHEETS, FILMS, STRANDS AND FILAMENTS

BACKGROUND AND SUMMARY OF THE INVENTION

In co-pending application Ser. No. 08/265,267 filed Jul. 1, 1994 (the disclosure of which is hereby incorporated herein), pending a method and composition of matter for removing organic contaminants from fluids such as liquids, gases, or soil in fluent form, or mixtures thereof, is provided. The present invention relates to a modification of the compositions and constructions described in the co-pending application which are more suitable for a number of different environments, and may be simpler and easier to handle and dispose of in some situations than the compositions and configurations in the co-pending application.

According to the present invention a foamed sheet or film, strands, or mat is formed from particular polymers, elastomeric material, and typically a foaming agent. The constructions according to the invention internally absorb essentially all hydrocarbons and many other liquid chemical contaminants. The invention is particularly suitable for use in absorbing motor oils, mineral spirits, naphtha, diesel fuels, heating oil, gasoline, crude oil, and a wide variety of chemical contaminants. Rather than functioning by way of surface attraction alone (adsorption) as many prior art oil collecting materials do, the constructions according to the invention initially absorb by surface absorption but immediately begin to internally absorb the liquid. Depending upon the particular hydrocarbon the constructions according to the invention will become dry to the touch within 5–15 minutes as the hydrocarbon is absorbed, permitting further collection capability. For heavier hydrocarbons such as motor oils and lubricating oils the constructions according to the invention will remain dry to the touch and will hold the liquid from being released even if handled or walked upon. For lighter hydrocarbons such as gasoline and naphtha the constructions according to the invention absorb the liquid at a very fast rate and dramatically reduce the vapor pressure of the volatile liquid. For spills of light hydrocarbons the constructions according to the invention can dramatically reduce flash potential and flammability tendencies.

The constructions according to the invention have a series of carefully architectured molecular domains throughout their polymer structure. These domains are highly attractive to hydrocarbons and seek and hold hydrocarbon material very tightly once they are encountered. After becoming completely saturated the polymer functions much like polypropylene through its surface attraction of hydrocarbons. Because of their advantageous properties as described above the constructions according to the invention may be simply and easily used and then picked up and disposed of in accordance with proper disposal techniques for the absorbed material (no special requirements being necessary for disposal because of the constructions themselves.)

The constructions according to the invention can be used for any water system requiring the removal of hydrocarbons. For example the constructions of the invention are ideal for removing water/oil mixtures from unused oil tanks, contaminated streams, municipal water supplies, storm water, waste water sources, and chemically contaminated soil and water. The constructions according to the invention can be used to absorb oil based products in service stations, garages, truck depots, and the like. In the form of a mat the constructions of the invention will absorb oil on a surface (e.g. act as a spill collecting mat). The constructions also offer comfort for operators who need a sponge-like rubber surface to stand upon. The substitution of constructions according to the invention for carbon in chemical and odor absorption applications is another use area, there also being a wide variety of other particular uses, techniques, and the like, including as described in the co-pending application.

According to one aspect of the present invention a foam sheet or film capable absorbing of organic contaminants is provided. The foam sheet or film is formed from a composition comprising: 10–45% by weight polystyrene, polyethylene, polypropylene, and their common copolymers (e.g., ethylene-vinyl acetate, ethylene-propylene copolymers with 3–6% ethylene, ethylene-methylacrylate), and mixtures thereof. About 0.1–1% by weight blowing agent (preferably hydrate salts). And at least 50% by weight elastomeric material. The elastomeric material may comprise: styrene/butadiene/styrene triblock polymer (e.g. Kraton D types); styrene/butadiene copolymer (e.g. Stereon 840A); styrene/isoprene/styrene triblock polymer (e.g. Kraton D. types); ethylene copolymers with 1-octane, 1-hexene or 1-butene; styrene-ethylene-butene-styrene triblock polymers, commonly referred to as SEBS polymers (e.g. Kraton G types); ethylene terpolymers with propylene, 1-hexene, 1-butene (Vestoplast); ethylene-propylene rubber (EPR) (e.g. from DSM and Bayer); ethylene-propylene-diene rubber (EPDM) (e.g. Epsyn rubbers from DSM and Vistalon rubbers from Exxon); thermoplastic vulcanized rubber (TPV), such as EPDM/PP (e.g. Santoprene types); isobutylene copolymers (e.g. from Exxon such as Vistanex types); and/or mixtures thereof. For example the elastomeric material may comprise about 54–89.9% by weight elastomeric material (e.g. styrene/butadiene/styrene triblock copolymer). Preferably the foam sheet or film consists of the above components, although fillers (as described in the co-pending application) may be included for some uses. For example the sheet or film may be formed from a composition consisting essentially of styrene/butadiene/ styrene triblock polymer, polystyrene, and blowing agent, and is capable of absorbing at least 100% of its weight of organic liquid.

The construction as described above may be in film form, and may be provided as an extrusion coat on a plastic (typically polypropylene) fiber mat. The film typically has a thickness of between about 5–200 mils (e.g. about 10 mils). When the construction as described above is in sheet form, it has a thickness that is between about 65–260 mils, e.g. about 130 mils, and a width of at least about six inches, and typically may be provided in a variety of different lengths and widths, e.g. widths up to about 48 inches. This construction is capable of absorbing at least about 90% of its weight of organic liquid, such as hydrocarbons, and typically at least 100% of its weight.

According to another aspect of the present invention there are provided a plurality of foam strands capable of absorbing organic contaminants and formed from a composition comprising: 10–-9% by weight polystyrene, polyolefin, polypropylene, and mixtures thereof, or the other polymers as described in the sheet embodiment above. About 0.1–1% by weight blowing agent. And at least about 50% by weight elastomeric material. The elastomeric material preferably comprises the same elastomeric materials as described above with respect to the foam sheet or film embodiment. In one particular example the elastomeric material comprises about 50–89.9% by weight elastomeric material. The strands also may have inert or filler materials as described in the co-pending application, but typically consist essentially of materials as described above, and are capable of absorbing at least 100% of their weight of organic liquid. The strands may be used in strand form, or may be cut up and formed into a mat (preferably using conventional non-woven techniques) of continuous filaments with random orientation and having diameters between 0.050–0.250 inches (e.g. about 0.125 inches in diameter).

According to another aspect of the present invention a filament mat is provided comprising: A plurality of randomly oriented filaments in mat form, the filaments formed from a composition comprising: 5–45% polypropylene, 0–1% blowing agent, and the remainder an elastomeric material as described above. Preferably the mat filaments are formed from a composition consisting essentially of polypropylene, blowing agent, and styrene/ibutadiene/styrene triblock polymer. The filaments are about 0.005–0.060 inches in diameter, which are larger than the polypropylene filaments used in some nonwoven mats now on the market.

According to another aspect of the invention a method of removing organic contaminants, such as hydrocarbons, from contaminated liquid, gas, soil in fluent form, or mixtures thereof, is provided. The method comprises the following steps: (a) Producing a foamed sheet, film, strands, or mat from a composition comprising 5–49% by weight polystyrene, polyolefin, polyethylene, polypropylene, and mixtures thereof; about 0–1% by weight blowing agent; and substantially the balance of elastomeric material. And, (b) bringing contaminated liquid, gas, soil in fluid form, or mixtures thereof into contact with the sheet, film, strands, or mat, so that the sheet, film, strands, or mat absorb at least 90% (preferably at least 100%) of their weight of organic contaminants from the contaminated liquid, gas, soil in fluid form, or mixtures thereof. The balance of a composition produced in step (a) is typically as close to all elastomeric material as practical, but in some cases a small amount of filler or inert material may be present.

Step (a) may be practiced in a number of different manners. In one technique step (a) is practiced by forming a sheet or film by extruding through a sheet or film die a composition of 10–45% polystyrene, 0.1–1% blowing agent, and substantially the balance elastomeric material (e.g. styrene/ butadiene/styrene triblock polymer). In another technique step (a) is practiced by forming a plurality of foamed strands having a diameter of 0.050≈0.25 inches (e.g. about .125 inches) by extruding through die holes a composition of 10–49% polystyrene, 0.1–1% blowing agent, and substantially the balance elastomeric material (e.g. styrene/butadiene/styrene triblock polymer). In a third technique step (a) is practiced by forming a plurality of foamed filaments by extruding through die holes a composition of 5–45% polypropylene, 0–1% blowing agent, and substantially the balance elastomeric material (e.g. styrene/butadiene/styrene triblock polymer) having an average diameter of 0.005–0.060 (e.g. about 0.02–0.03 inches), and forming the filaments into a non-woven mat of continuous filaments with random orientation.

It is the primary object of the present invention to provide for the simple, effective, and advantageous removal of organic contaminants, such as hydrocarbons, from fluids such as liquids, gases, and soil in fluent form. This and other objects of the invention will become clear from an inspection of the detailed description of the invention and from the appended claims.

DETAILED DESCRIPTION OF THE DRAWINGS

Figure 1:
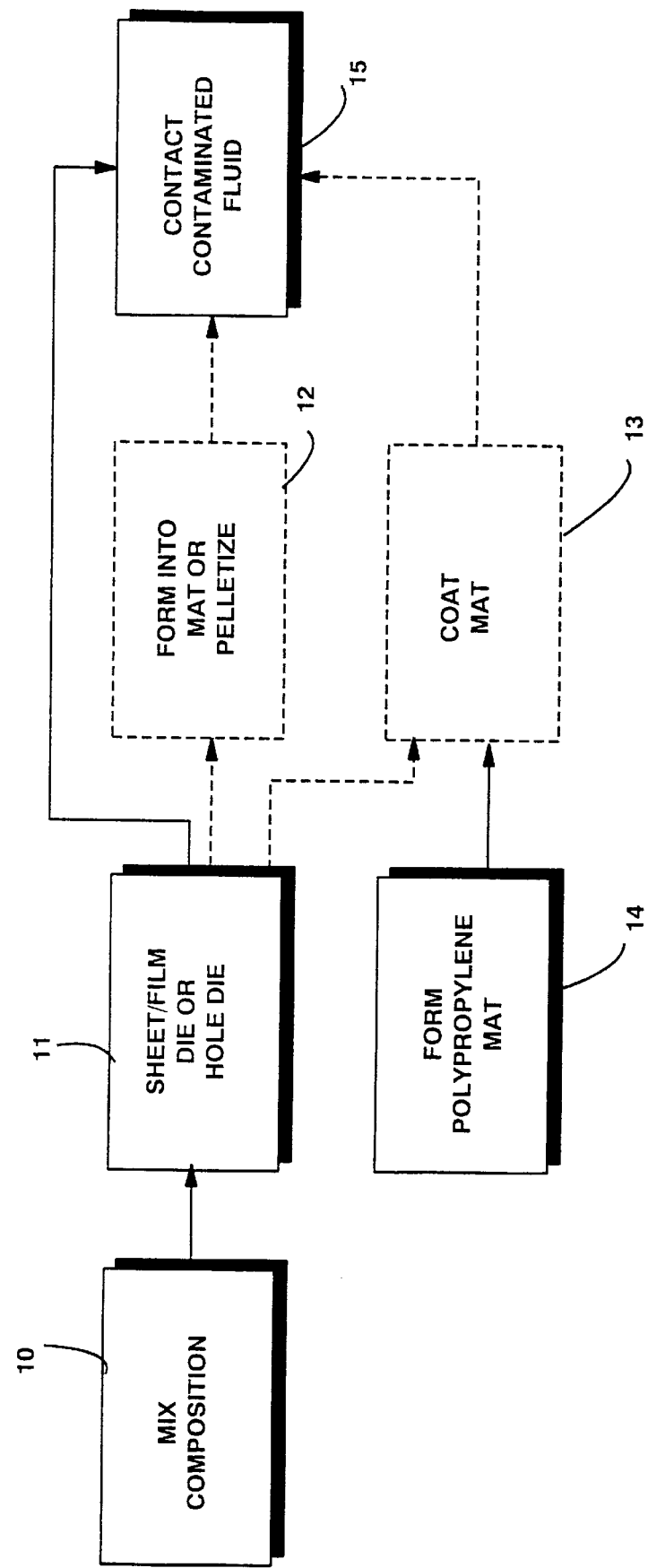
FIG. 1 is a schematic view showing exemplary method steps that may be used in the practice of the present invention.

FIG. 1 schematically illustrates various steps that may be utilized in the practice of the method according to the present invention. As indicated by box 10 in FIG. 1 the raw materials which are to form the composition of the construction according to the present invention are mixed together. Typically the composition mixed together in box 10 comprises 5–49% by weight polymer, such as polystyrene, polyethylene, polypropylene, and their common copolymers (e.g. ethylene-vinyl acetate, ethylene-propylene copolymers with 3–6% ethylene, ethylene-methylacrylate), and mixtures thereof; about 0–1% by weight blowing agent (such as sodium borate tetrahydrate); and substantially the balance of elastomeric material. The particular components and percentages will depend upon exactly what construction is to be formed, such as a foamed sheet or film, foamed strands, filament mat, and a film on a mat.

Preferably the blowing agent is a hydrate salt, such as sodium tetraborate hydrate, which is referred to as an endothermic blowing agent, and azodicarbonamide-type, such as Celogen AZBN. Sodium tetraborate has been found to be the most effective whole series of hydrate blowing agents. They function by losing water at about 150° C., which causes the polymer to foam.

For all constructions according to the invention there are some elastomers which are particularly suitable. One particularly advantageous elastomeric material is triblock polymer of styrene/ butadiene/styrene, or styrene/isoprene/ styrene, e.g. Kraton D types. Other particularly advantageous elastomers are styrene/butadiene copolymers (e.g. Stereon 840A) and polyethylene copolymers of 1-octene, 1-hexene, or 1-butene (e.g. for example that is sold commercially under the trademark "ENGAGE" by Dow Chemical or that sold by Exxon Chemical under the trademark "EXACT", such as EXACT 4049); styrene-ethylene-butene-styrene triblock polymers, commonly referred to as SEBS polymers (e.g. Kraton G types); ethylene terpolymers with propylene, 1-hexene, 1-butene (Vestoplast); ethylene-propylene rubber (EPR) (e.g. from DSM and Bayer); ethylene-propylene-diene rubber (EPDM) (e.g. Epsyn rubbers from DSM and Vistalon rubbers from Exxon); thermoplastic vulcanized rubber (TPV), such as EPDM/PP (e.g. Santoprene types); isobutylene copolymers (e.g. from Exxon such as Vistanex types); and/or mixtures thereof.

After appropriate mixing (and typically heating to render extrudable) of the composition utilizing conventional techniques, as indicated by box 10, the composition is acted upon to form the particular physical constructions desired, as indicated by box 11 in FIG. 1. For example the material may be extruded through a sheet die from an extruder, or extruded in the form of a film. Alternatively the material may be passed through a hole die and then into a water bath in a conventional manner, and depending upon the particular composition or use required the strands so formed may be constructed into a non-woven mat of continuous filaments, used as is, or pelletized by running them through a Conair pelletizer.

Dotted line box 12 schematically illustrates the formation of the strands into a mat or pelletizing them, while the dotted line box 13 shows extrusion coating of a film onto a preconstructed mat, such as a polypropylene mat supplied from box 14.

After construction of the configuration and its disposition in a proper form, the configuration according to the invention is moved into contact with contaminated fluid, as indicated schematically by box 15 in FIG. 1. For example the configuration according to the invention may be applied directly to contaminated fluid (such as thrown into a puddle of contaminated fluid, placed in or on top of a contaminated body of water, placed in a tower or other container through which contaminated fluid flows, or other suitable or conventional application thereof). For example contaminated water may be pumped through containers or "socks" of the configurations according to the invention to remove essentially all hydrocarbons or chemicals which contaminate the water. When in strand form, the compositions according to the invention can be used to "sweep" or otherwise mop the surface of contaminated water or soil. Strands allow the coverage of a large area while using a minimum amount of material to cover the area. The strands may also be used in flowing streams of water, such as in sewers or streams to remediate the water of any petroleum residues. When in a mat configuration the compositions of the invention may be placed on the floor and absorb spills on the floor (e.g. from machinery or piping in the area) as well as offering cushioning for personnel in order to lessen fatigue from standing. Sheets of composition according to the invention, e.g. 6–48 inches wide and about one-quarter inch thick cut to any desired length, sorb motor oil completely within twenty minutes, providing a dry surface.

The configurations according to the invention typically contain negligible ash, are not biodegradable, are natural in color (unless dyed), soften in boiling water, have negligible volatile content, and are odor free. While water will not be sorbed by the materials according to the invention, they will readily sorb diesel fuel, motor oil, paint thinners, crude oil, benzene, toluene, zxylene, PCB's, petroleum residues such as greases and lubricants, gear oil, hydraulic fluid, and naphtha products.

Some particular examples of products that may be formed according to the present invention are set forth in the written examples below and with reference to FIGS. 2 through 5.

In the formation of a foamed sheet or film, typically the composition utilized would be 10–45% by weight polystyrene, or the other polymers described above (preferably polystyrene), 0.1–1% blowing agent such as sodium tetraborate, and at least about 50% by weight (and preferably substantially the balance) elastomeric material, such as the elastomeric materials described above. The sheet thickness is typically between about 65–260 mils, e.g. about one-quarter of an inch.

Figure 2:
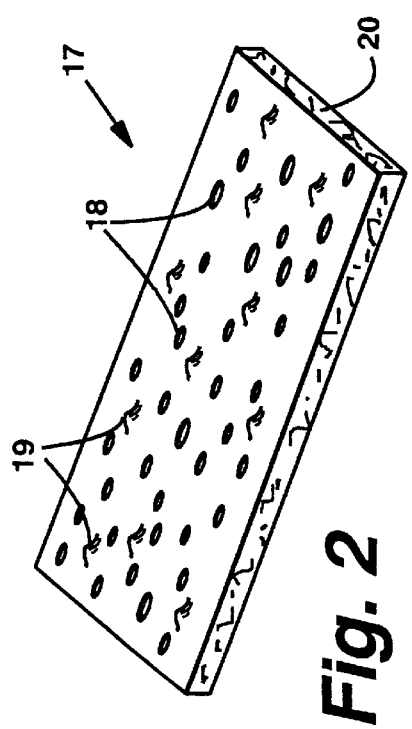
FIG. 2 is a top perspective view of an exemplary foamed sheet according to the present invention.

In one particular example, a composition consisting essentially of about 30% polystyrene, about 69.5% styrene/butadiene/styrene triblock copolymer, and about 0.5% blowing agent (Celogen AZBN), was extruded through a sheet die from an extruder to form a foamed continuous sheet having a thickness of about 130 mils, such a sheet being illustrated schematically at 17 in FIG. 2. The sheet 17 was found to absorb over 75% by weight of mineral spirits, and over 100% by weight of 10W-30 motor oil. After absorption of the motor oil the sheet was substantially dry to the touch in less than fifteen minutes and the sheet 17 could be readily picked up and disposed of without releasing any significant amount of absorbed hydrocarbon, or could be walked on without exuding significant amounts of absorbed hydrocarbon. The sheet 17 absorbed the mineral spirits at a very fast rate and drastically reduced the vapor pressure of that volatile liquid, as well as reducing flash potential and flammability tendency.

The sheet 17 as illustrated in FIG. 2 is shown with a width of about six inches, but widths up to about 48 inches are practical. The surface texture of the sheet 17 is typically rough and uneven, having a plurality of "pock marks" illustrated schematically at 18, and a number of upstanding uneven areas or ridges, illustrated schematically at 19. When the sheet 17 is curled or rolled up it readily returns to its initial configuration having a high degree of elasticity, and is difficult to tear. The interior of the sheet 17, as visible from an end 20, has a solid, dense appearance, however the entire sheet 17 not only initially functions by surface adsorption, but substantially immediately begins to internally absorb the organic contaminants which it collects.

In a second example, a composition the same as the previous example only with a triblock polymer of styrene/isoprene/styrene was extruded through a film die of about 0.040 inch gap to produce a foamed sheet which absorbed more than 100% by weight of mineral spirits.

Figure 3:
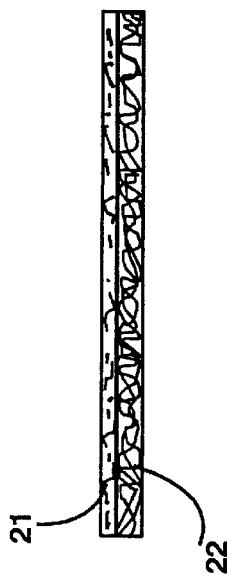
FIG. 3 is a side view, with the film exaggerated in size for clarity of illustration, of an exemplary mat with an extrusion coat of a foamed film according to the present invention thereon.

In a third example, a composition the same as that in the second example was passed through a film die to form a foamed film of about 10 mils thickness, the foamed film being illustrated schematically at reference numeral 21 in FIG. 3. The foamed film 21 was extrusion coated directly onto a conventional polypropylene fiber mat 22 to form a composite structure of about twelve inches width. The composite structure absorbed 100% of its weight of 10W-30 motor oil.

Figure 4:
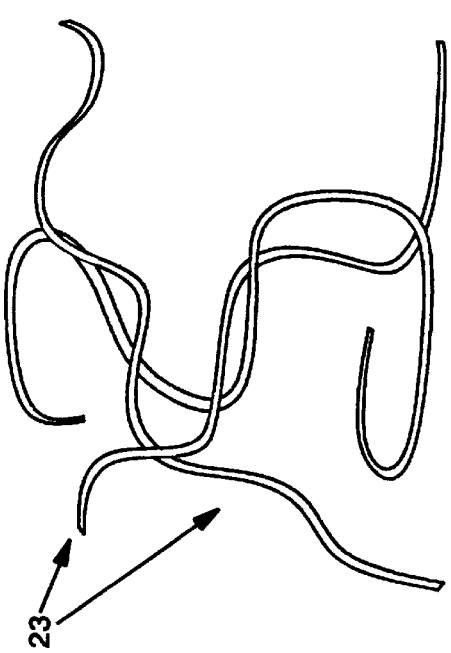
FIG. 4 is a top perspective view of a plurality of exemplary foam strands according to the present invention.

Foamed strands that may be produced according to the present invention are shown schematically by reference numeral 23 in FIG. 4. The foamed strands typically are constructed by using a composition of 10–49% by weight polystyrene, or the other polymers described above, about 0.1–1% by weight blowing agent, and at least about 50% by weight elastomeric material, preferably substantially the balance as elastomeric material. The strands typically have a diameter between 0.050–0.25 inches (e.g. about 0.125 inches).

In a fourth example, the foamed strands 23 were made by extruding a composition of 40% polypropylene, 60% styrene/butadiene/ styrene triblock copolymer, and 0.5% blowing agent (Celogen AZBN) through die holes of 3 mm in diameter into a water bath in a conventional manner. The strands 23 produced were used to "sweep" or "mop" the surface of contaminated fluid, and absorbed over 100% of their weight of 10W-30 motor oil.

In addition to being utilizable in the form illustrated at 23 in FIG. 4, the strands 23 may be pelletized by running them through a Conair pelletizer, or can be cut up and used to form a non-woven mat by conventional techniques.

Figure 5:
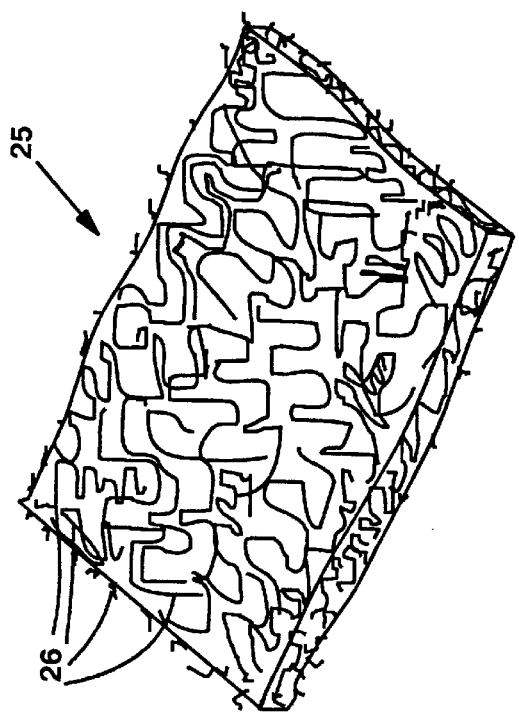
FIG. 5 is a top plan view of a non-woven mat produced according to another aspect of the invention.

FIG. 5 illustrates a filament mat 25 according to the present invention. The mat 25 includes a plurality of randomly oriented filaments, such as indicated schematically at 26 in FIG. 5, in mat form. The filaments 26 are formed from a composition comprising 5–45% polymer (preferably polypropylene), 0–1% blowing agent, and substantially the remainder elastomeric material, such as described above. For example the mat filaments may be formed from a composition consisting essentially of polypropylene, blowing agent, and styrene/butadiene/styrene triblock copolymer. The continuous filaments 26 of the mat typically have average diameters between 0.005–0.060 (e.g. about 0.02–0.03 inches) inches.

In a fifth example, a composition of 40% polypropylene, 60% styrene/butadiene/styrene triblock copolymer, and 0.5% blowing agent (Celogen AZBN) was extruded through an eleven hole die whose holes were 0.02 inches in diameter. The strands were formed into a mat of continuous filaments with random orientation by moving the take-off from side-to-side on a continuous belt with water quenching, as is conventional. This movement resulted in a continuous mat 25 with random orientation whose filaments 26 were, on average, about 0.025 inches in diameter. The mat 25 is suitable for workers to stand on in environments where there is leakage of organic materials, and if used to soak up contaminants is capable of absorbing at least about 100% of its weight of organic contaminants such as hydrocarbons.

The same composition as described in the previous example, only without any blowing agent, was made into a random mat 25 in the same manner.

It will thus be seen that according to the present invention a very advantageous method and compositions are provided for absorbing organic contaminants, such as hydrocarbons. While the invention has been herein shown and described in what is presently conceived to be the most practical and preferred embodiment thereof it will be apparent to those of ordinary skill in the art that many modifications may be made thereof within the scope of the invention, which scope is to be accorded the broadest interpretation of the appended claims so as to encompass all equivalent structures and methods.

What is claimed is:

1. A foamed sheet or film capable of absorbing organic contaminants, comprising:
    a foamed sheet or film formed from a composition comprising: 10–45% by weight polystyrene; about 0.1–1% by weight blowing agent; and at least about 50% by weight elastomeric material, and which is capable of absorbing at least 90% of its weight of organic liquid.
2. A foamed sheet or film as recited in claim 1 wherein the elastomeric material comprises one or more of: styrene/butadiene/styrene triblock polymer; styrene/butadiene copolymer; styrene/isoprene/styrene triblock polymer; ethylene copolymers with 1-octane, 1-hexene or 1-butene; SEBS polymers; EPR; EPDM; TPV; and isobutylene copolymers.
3. A foamed sheet or film as recited in claim 2 wherein the elastomeric material comprises about 54–89.9% by weight.
4. A foamed sheet or film as recited in claim 3 wherein said sheet or film is formed from a composition consisting essentially of styrene/butadiene/styrene triblock polymer, polystyrene, and blowing agent, and is capable of absorbing at least 100% of its weight of organic liquid.
5. A foamed sheet or film as recited in claim 4 wherein said blowing agent is sodium tetraborate.
6. A foamed sheet or film as recited in claim 2 in film form, and provided as an extrusion coat on a plastic fiber mat.
7. A foamed sheet or film as recited in claim 6 wherein the plastic fiber mat is a polypropylene fiber mat, and wherein said film has a thickness of between about 5–200 mils.
8. A foamed sheet or film as recited in claim 1 in sheet form, having a thickness of between about 65–260 mils, and capable of absorbing at least 100% of its weight of organic liquid.
9. A foamed sheet or film as recited in claim 8 wherein the elastomeric material comprises one or more of: styrene/butadiene/styrene triblock polymer; styrene/butadiene copolymer; styrene/isoprene/styrene triblock polymer; ethylene copolymers with 1-octane, 1-hexene or 1-butene; SEBS polymers; EPR; EPDM; TPV; and isobutylene copolymers.
10. A foamed sheet or film as recited in claim 1 wherein the elastomeric material comprises about 54–89.9% by weight.
11. A foamed sheet or film as recited in claim 1 wherein said sheet or film is formed from a composition consisting essentially of styrene/butadiene/styrene triblock polymer, polystyrene, and blowing agent, and is capable of absorbing at least 100% of its weight of organic liquid.
12. A foamed sheet or film as recited in claim 1 in film form, and provided as an extrusion coat on a plastic fiber mat.
13. A foamed sheet or film as recited in claim 12 wherein the plastic fiber mat is a polypropylene fiber mat, and wherein said film has a thickness of between about 5–200 mils.
14. A foamed sheet or film as recited in claim 11 wherein said blowing agent is sodium tetraborate.
15. A foamed sheet or film as recited in claim 10 in sheet form, having a thickness of between about 65–260 mils, and capable of absorbing at least 100% of its weight of organic liquid.
16. A foamed sheet or film as recited in claim 12 wherein said mat comprises a plurality of randomly oriented filaments in non-woven form, said filaments formed of a composition comprising 5–45% polypropylene, 0–1% blowing agent, and substantially the remainder elastomeric material, and said filaments having a diameter of 0.0005–0.060 inches.
17. A foamed sheet or film as recited in claim 1 wherein said elastomeric material comprises styrene/butadiene/styrene triblock polymer.
18. A foamed film capable of absorbing organic contaminants and provided as an extrusion coat on a plastic fiber mat, comprising:
    a foamed film formed from a composition comprising: 10–45% by weight of one or more of polystyrene, polyethylene, polypropylene, and their copolymers; about 0.1–1% by weight blowing agent; and at least about 50% by weight elastomeric material; and
    wherein said mat comprises a plurality of randomly oriented filaments in nonwoven form, said filaments formed of a composition comprising 5–45% polypropylene, 0–1% blowing agent, and substantially the remainder elastomeric material, and said filaments having a diameter of 0.0005–0.060 inches.
19. A foamed film capable of absorbing organic contaminants and provided as an extrusion coat on a plastic fiber mat, comprising:
    a foamed film formed from a composition comprising: 10–45% by weight of one or more of polystyrene, polyethylene, polypropylene, and their copolymers; about 0.1–1% by weight blowing agent; and at least about 50% by weight elastomeric material; and
    wherein the plastic fiber mat is a polypropylene fiber mat, and wherein said film has a thickness of between about 5–200 mils.

* * * * *